No. 643,727. Patented Feb. 20, 1900.
E. E. & H. OLSON.
CLEVIS FOR AGRICULTURAL IMPLEMENTS.
(Application filed Oct. 23, 1899.)
(No Model.)
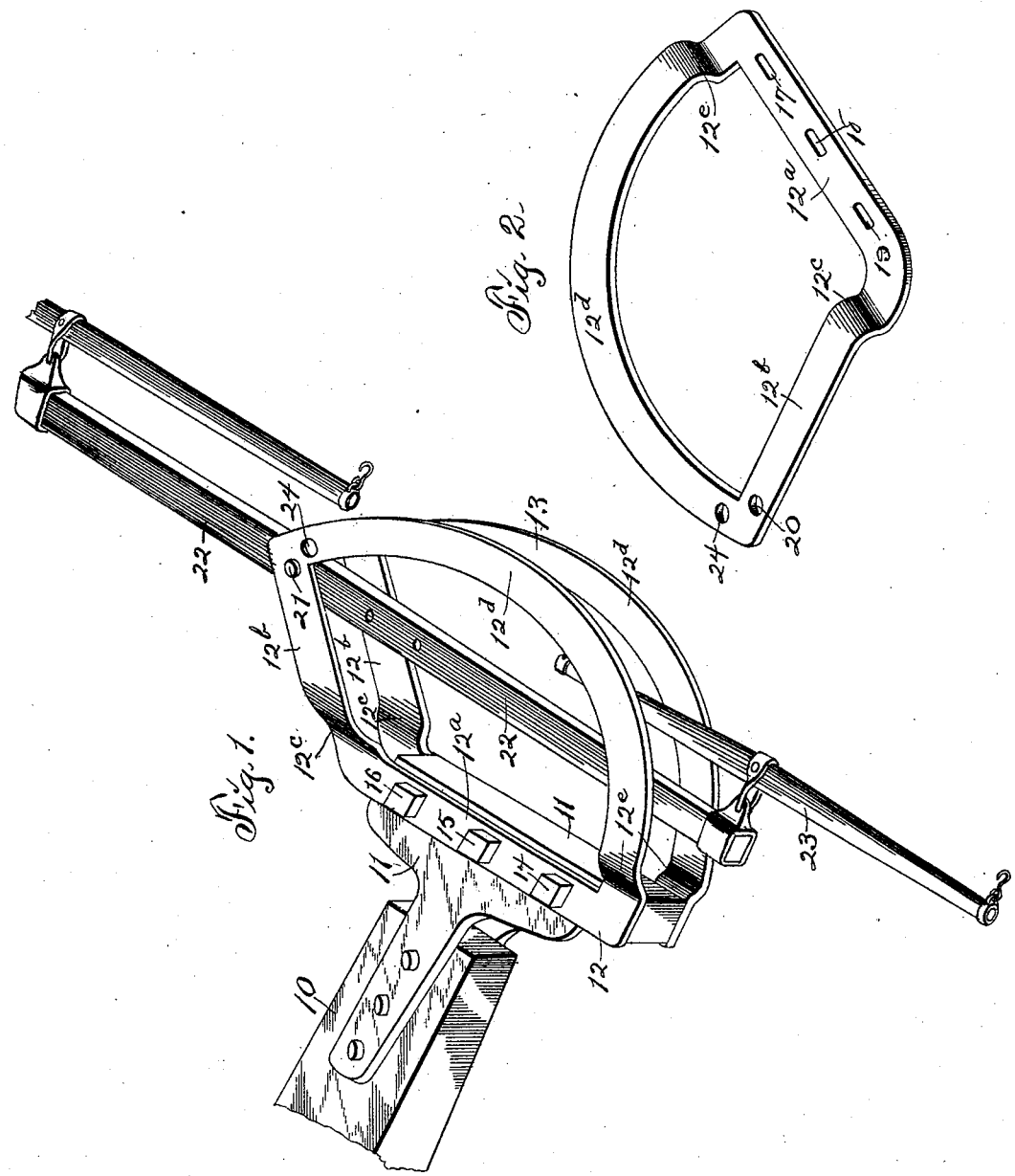
Witnesses:
R. G. Orwig.
Charles F. Wilcox.
Inventors: Edward E. Olson,
and Hector Olson.
By Thomas G. Orwig, Attorney.

UNITED STATES PATENT OFFICE.

EDWARD E. OLSON AND HECTOR OLSON, OF ROLAND, IOWA.

CLEVIS FOR AGRICULTURAL IMPLEMENTS.

SPECIFICATION forming part of Letters Patent No. 643,727, dated February 20, 1900.

Application filed October 23, 1899. Serial No. 734,536. (No model.)

*To all whom it may concern:*

Be it known that we, EDWARD E. OLSON and HECTOR OLSON, citizens of the United States, residing at Roland, in the county of Story and State of Iowa, have invented a new and useful Clevis for Agricultural Implements, of which the following is a specification.

The object of this invention is to provide improved means for equalizing the draft of horses in attaching said horses to a plow, harvester, or other device.

Our invention consists in the combination, with the plow-clevis, of a pair of counterpart plates adjustably mounted on the clevis and spaced apart and provided with means for attaching a whiffletree to said plates at a point laterally removed from the clevis.

Our invention consists, further, in the combination, construction, and arrangement of elements hereinafter set forth, pointed out in our claims, and illustrated by the accompanying drawings, in which—

Figure 1 is a perspective illustrating our device mounted as required for practical use. Fig. 2 is a perspective of one of the evener frames or plates detached from the whiffletree and plow-clevis.

In the construction and mounting of the device, as shown, the numeral 10 designates a plow-beam, and 11 a plow-clevis fixed to and extending forwardly from said beam. Metallic plates or frames 12 13 of skeleton form are mounted on the upper and lower faces of the forward portion of the clevis 11 in horizontal positions and are secured to the clevis by bolts 14 15 16. The frames or plates 12 13 are of similar construction and comprise the rear bar 12$^a$, the end bar 12$^b$ at an oblique angle to the rear bar and offset at 12$^c$ from the plane of said rear bar, and the curved front bar 12$^d$, offset at 12$^e$ from the plane of the rear bar, connecting the outer end of the rear bar to the forward end of the end bar, the whole being rigidly or integrally formed. The plate 12 is placed in a horizontal position on the top of the clevis 11, with the end and front bar thereof projecting upwardly and forwardly therefrom, and the plate 13 is placed on the lower surface of the clevis, with its front and end bars projecting downwardly and forwardly from said clevis. Slots 17 18 19 are formed in the rear bars of the frames or plates 12 13, and the bolts 14 15 16 are extended through said slots and through apertures or bolt-holes in the clevis and are secured by nuts (not shown) on their lower ends.

Assuming that the plowshare is located directly beneath the beam 10, the forward ends of the end bars of the plates or frames 12 13 will project inwardly toward the "land" of the field being plowed and the left of the "landside" of a right-hand plow. Coinciding bolt-holes 20 are formed in the forward ends of the end bars 12$^b$ of the frames or plates 12 13, and a bolt 21 is mounted in said holes. A whiffletree 22 is pivoted at the left of its center on the bolt 21, and a singletree 23 is attached to the long arm of the whiffletree. Two or more horses may be attached to the short arm of the whiffletree to balance the draft of the horse attached to the singletree 23, and the combined draft of all the horses will be exerted on the bolt 21 in a "line of draft" to the left of the plowshare, and being so exerted will tend to pull the plow straight and overcome the tendency of the plow to enter the land or unplowed ground an undesirable distance, at the same time permitting one horse attached to the singletree 23 to walk in the furrow and the remaining horses on the land.

If the whiffletree is fulcrumed at its center on the bolt 21, two horses may be attached thereto and pull against each other, the line of draft being the same.

Another set of holes 24 for the bolt 21 are formed in the left ends of the front bars of the frames or plates 12 13, whereby lateral adjustment of the bolt and line of draft may be had when desired. The frames or plates 12 13 may be moved or adjusted laterally of the clevis by loosening the nuts and moving said plates relative to the bolts.

We claim as our invention—

1. In a draft device, a skeleton frame consisting of a straight length having bolt-holes and an extension at one end projecting at an angle and the said extension connected with the other end of the said straight length by a curved portion and bends in the frame to produce shoulders near the ends of the straight length having perforations, and the complete frame adapted to be fixed to a mating frame, a mating skeleton frame and a clevis, arranged and combined as shown and described for the purposes stated.

2. In a draft device, the skeleton plates formed with slots in their rear bars, the clevis between said plates, the bolts extended through the slots of the plates and said clevis and means for attaching a whiffletree to the plates.

3. In a draft device, the skeleton plates formed of rear bars, end bars at oblique angles to the rear bars and curved front bars integral therewith, the clevis between and bolted to the rear bars of the plates, the whiffletree between and fulcrumed to the plates at the jointure of the front and end bars thereof and means for adjusting said whiffletree.

4. In a draft device, the skeleton plates offset in opposite directions and mainly parallel with each other, the clevis to which the plates are bolted and means for fulcruming a whiffletree to said plates.

EDWARD E. OLSON.
     HECTOR OLSON.

Witnesses:
 H. E. MYRAH,
 C. D. HEGLAND.